(12) United States Patent
Dockter et al.

(10) Patent No.: US 7,054,882 B2
(45) Date of Patent: May 30, 2006

(54) METHOD AND SYSTEM FOR IMPROVING A TEXT SEARCH

(75) Inventors: Michael J. Dockter, Wellington, FL (US); Jochen F. Doerre, Stuttgart (DE); Ronald W. Lynn, Gilroy, CA (US); Joseph A. Munoz, San Mateo, CA (US); Randal J. Richardt, San Jose, CA (US); Roland Seiffert, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/365,648

(22) Filed: Feb. 12, 2003

(65) Prior Publication Data

US 2003/0135828 A1      Jul. 17, 2003

Related U.S. Application Data

(62) Division of application No. 09/620,930, filed on Jul. 21, 2000, now Pat. No. 6,691,107.

(51) Int. Cl.
*G06F 17/30* (2006.01)

(52) U.S. Cl. ............................. 707/102; 707/3; 707/4; 707/2

(58) Field of Classification Search ............... 707/1, 707/2, 3, 4, 5, 6, 7, 8, 104.1, 9, 10, 100, 101, 707/102, 103 R; 345/584; 382/305
See application file for complete search history.

(56) References Cited

U.S. PATENT DOCUMENTS

| | | | |
|---|---|---|---|
| 5,297,039 A | 3/1994 | Kanaegami et al. | 707/5 |
| 5,893,092 A * | 4/1999 | Driscoll | 707/5 |
| 5,926,808 A | 7/1999 | Evans et al. | 707/1 |
| 5,999,664 A | 12/1999 | Mahoney et al. | 382/305 |
| 6,026,409 A | 2/2000 | Blumenthal | 345/589 |
| 6,041,331 A | 3/2000 | Weiner et al. | 707/103 R |
| 6,289,353 B1 | 9/2001 | Hazlehurst et al. | 707/101 |
| 6,353,823 B1 | 3/2002 | Kumar | 707/102 |
| 6,704,727 B1 * | 3/2004 | Kravets | 707/5 |

OTHER PUBLICATIONS

Consens & Milo, *Algebras for Querying Text Regions*, © 1995 ACM 089791-730, pp. 11-22.

* cited by examiner

*Primary Examiner*—Jeffrey Gaffin
*Assistant Examiner*—Yicun Wu
(74) *Attorney, Agent, or Firm*—Sawyer Law Group LLP

(57) ABSTRACT

A method and system for improving text searching is disclosed. The method and system provides a network of document relationship and utilizes the network of document relationships to identify the region of documents that can be used to satisfy a user's request. In a preferred embodiment, the text searching method in accordance with the present invention augments a conventional text search by using information on document relationships and metadata. The text searching method and system improves upon conventional text search techniques by incorporating relationship metadata to define regions to search within. In the present invention the definition of a region is not limited to just categories as it includes neighborhoods around individual documents and sets which have been user defined.

12 Claims, 8 Drawing Sheets

Providing a network of document relationships — 202

Utilizing the document relationships to define a region that can satisfy a request — 204

METHOD AND SYSTEM FOR IMPROVING A TEXT SEARCH

CROSS REFERENCE TO RELATED APPLICATIONS

The present application is a divisional of U.S. patent application Ser. No. 09/620,930, filed Jul. 21, 2000, now U.S. Pat. No. 6,691,107 entitled, "Method and System for Improving a Text Search," which is incorporated herein by reference in its entirety.

FIELD OF THE INVENTION

The present invention relates generally to text searching and more particularly to a method and system for improving text searching.

BACKGROUND OF THE INVENTION

The majority of text searching algorithms is based on analyzing the content of documents. Conventional text searching algorithms only evaluate each document individually in a type of competition to see which document makes the top of the list. For example, Yahoo.com searches within categories. Other web sites, such as AltaVista, etc., offer similar services. When a user asks a query, he/she is looking for a small set of documents that provide an answer. Text queries tend to provide large answer sets and a one-size-fits-all relevancy ranking. These text searching algorithms typically include extracting words or phrases, creating indexing structures, and determining discriminators for calculating relevance. When a user asks a text query, the index identifies the candidate documents, the relevance is calculated for each document, the candidate documents are ordered by relevance, and the resulting list is returned to the user.

This is useful to a user when the list of candidate documents is relatively small. When the list becomes larger, other means of manipulating the list are needed. Why? Even though the relevance ranking tries to give a good order to the list, it may not be close to the criteria that user has in mind. Another source of imprecision is that a word submitted in a text query can have multiple meanings. A search for "jack" can yield results for card games, bowling, a children's game, fish, rabbits, etc. There are over 15 definitions of "jack" (http://www.dictionary.com/cgi-bin/dict.pl?term=jack). A large list requires refinement to factor out the candidate documents which do not match the user's criteria for selection.

Accordingly, what is needed is a system and method for improving the text search for documents. The present invention addresses such a need.

SUMMARY OF THE INVENTION

A method and system for improving text searching is disclosed. The method and system provides a network of document relationship and utilizes the network of document relationships to identify the region of documents that can be used to satisfy a user's request. In a preferred embodiment, the text searching method in accordance with the present invention augments a conventional text search by using information on document relationships. The text searching method and system improves upon conventional text search techniques by incorporating relationship metadata to define regions to search within. In the present invention the definition of a region is not limited to just categories as it includes neighborhoods around individual documents and sets which have been user defined.

DETAILED DESCRIPTION

The present invention relates generally to text searching and more particularly to a method and system for improving text searching. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is implemented in a computer or a computer network. In the preferred embodiment the present invention is implemented in a computer network, wherein client programs, also known as application programs, are not server-resident. Client programs are preferably external to the server so that they can operate on small size systems (e.g., personal computers, workstations, etc.). One of ordinary skill in the art will recognize that any client-server configuration may be used to implement the present invention, including a configuration wherein the client programs are resident in any computer including the server.

Figure 1:
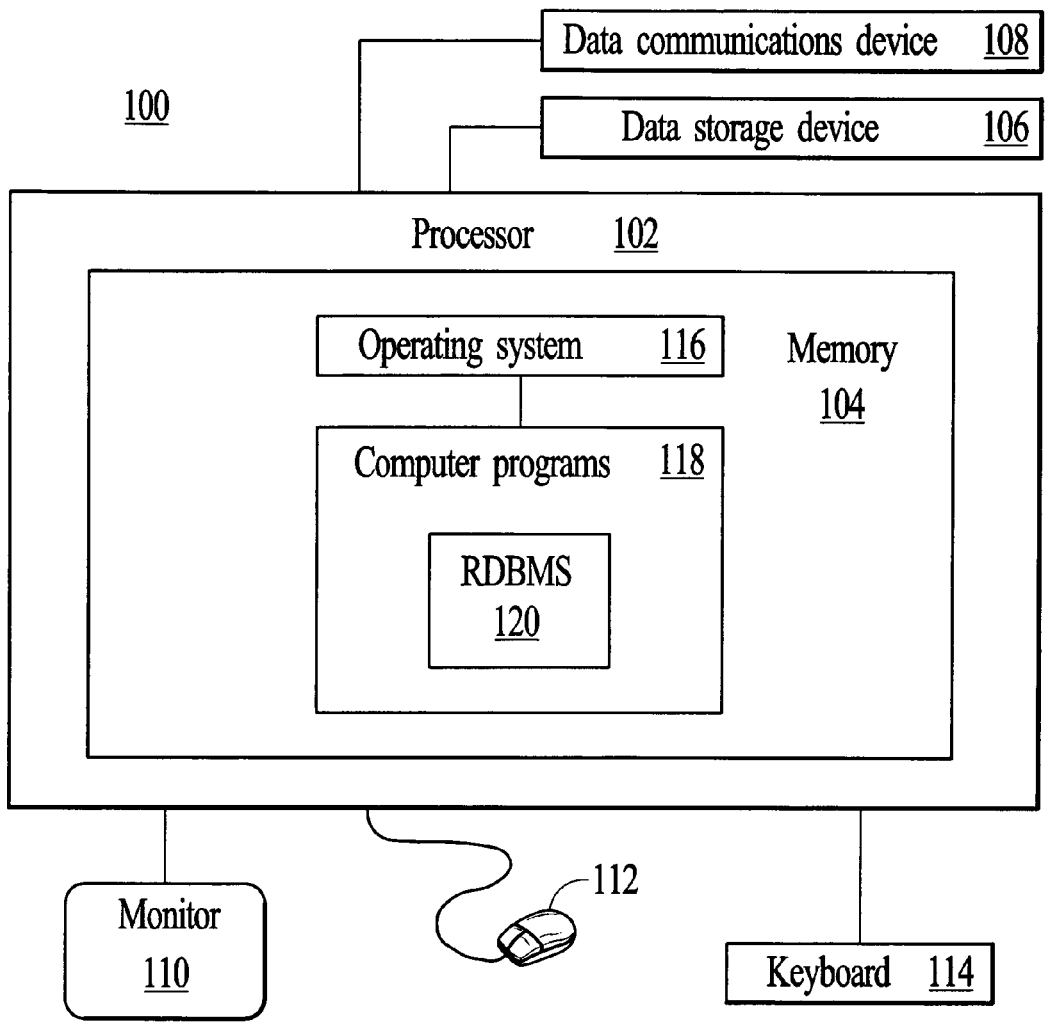
FIG. 1 illustrates a hardware environment used to implement the present invention.

Accordingly, FIG. 1 illustrates a hardware environment used to implement the present invention. As illustrated in FIG. 1, in the preferred embodiment the present invention is implemented in a server computer ("server") 100. The server 100 generally includes, a processor 102, a memory 104 such as a random access memory (RAM), a data storage device 106 (e.g., hard drive, floppy disk drive, CD-ROM disk drive, etc.), a data communication device 108 (e.g., modem, network interface device, etc.), a monitor 110 (e.g., CRT, LCD display, etc.), a pointing device 112 (e.g., a mouse, a track ball, a pad or any other device responsive to touch, etc.) and a keyboard 114. It is envisioned that attached to the computer 100 may be other devices such as read only memory (ROM), a video card drive, printers, peripheral devices including local and wide area network interface devices, etc. One of ordinary skill in the art will recognize that any combination of the above system components may be used to configure the server 100.

The server 100 operates under the control of an operating system ("OS") 116, such as MVS™, AIX™, UNIX™, OS/2™, WINDOWS™, WINDOWS NT™, etc., which typically, is loaded into the memory 104 during the server 100 start-up (boot-up) sequence after power-on or reset. In operation, the OS 116 controls the execution by the server 100 of computer programs 118, including server and/or client-server programs. Alternatively, a system and method in accordance with the present invention may be implemented with any one or all of the computer programs 118 embedded in the OS 116 itself without departing from the scope of the invention. Preferably, however, the client programs are separate from the server programs and are not resident on the server.

The OS 116 and the computer programs 118 each comprise computer readable instructions which, in general, are tangibly embodied in or are readable from a media such as the memory 104, the data storage device 106 and/or the data communications device 108. When executed by the server 100, the instructions cause the server 100 to perform the steps necessary to implement the present invention. Thus, the present invention may be implemented as a method, apparatus, or an article of manufacture (a computer-readable media or device) using programming and/or engineering techniques to produce software, hardware, firmware, or any combination thereof.

The server 100 is typically used as a part of an information search and retrieval system capable of receiving, retrieving and/or dissemination information over the Internet, or any other network environment. One of ordinary skill in the art will recognize that this system may include more than one of server 100.

In the information search and retrieval system, such as a digital library system, a client program communicates with the server 100 by, inter alia, issuing to the server search requests and queries. The server 100 then responds by providing the requested information. The digital library system is typically implemented using a relational database management system software (RDBMS) 120 such as the DB2™ by IBM Corporation. The RDBMS 120 receives and responds to search and retrieval requests and termed queries from the client. In the preferred embodiment, the RDBMS 120 is server-resident.

In the digital library system, such as IBM Content Manager by IBM Corporation, a library server (such as server 100) performs a library server program ("server program") and an object server (such as server 100) performs an object server program (also "server program"). This dual-server digital library system is typically used as a large-scale information objects search and retrieval system which operates in conjunction with the RDBMS 120. Large-scale information objects ("objects") include a high resolution digital representation of ancient works of authorship and ancient works of art such as those found in the Vatican, as well as movies, classic and modem art collections, books, etc.

The objects themselves are typically stored in a relational database connected to the object server, and the information about the objects is stored in a relational database connected to the library server, wherein the server program(s) operate in conjunction with the RDBMS 120 to first store the objects and then to retrieve the objects. One of ordinary skill in the art will recognize that the foregoing is an exemplary configuration of a system which embodies the present invention, and that other system configurations may be used without departing from the scope and spirit of the present invention.

To take advantage of a system and method in accordance with the present invention, a connection server apparatus is necessary. A preferred embodiment of a connection server is disclosed in U.S. Pat. No. 5,687,367 entitled "Facility for the Storage and Management of Connection (Connection Server)" and assigned to the assignee of the present invention. The Connection Server is a general purpose, extensible facility, with accessible interfaces that can be included as a component in many systems. The Connection Server component is designed to provide a generic link management facility. The present invention creates a general-purpose facility for the storage and management of Connections that is tailorable, accessible, and tuneable for many purposes. Consumers of this service want to interact with this system with a minimum effort and be connected to associated objects with the least cost and time.

The Connection Server provides very flexible structures for the identification of objects to be interconnected, the identification of the links which connect them, and the auxiliary information needed to materialize objects when they are referenced.

The Connection Server is designed as a stand-alone reusable component. It interfaces with other independent components for services such as classification attributes, distributed database services, (object) storage, etc. Clean public programming interfaces are available for all components. It is independent from the "front-end", the user driven display of the Connections and associated metadata. It is independent from any authoring facilities which may be used to customize the services, metadata, etc., that are provided.

Figure 2:
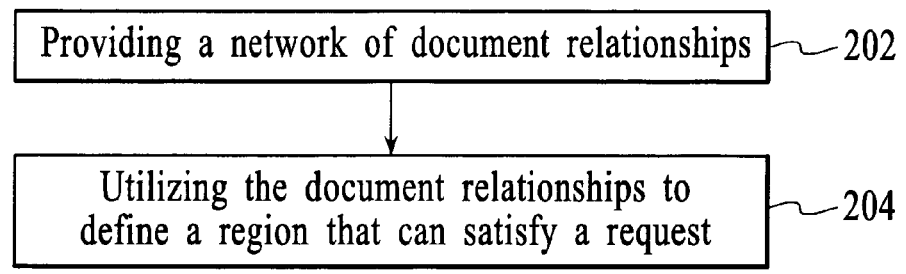
FIG. 2 is a flow chart in accordance with the present invention.

A system and method in accordance with the present invention provides for an improved text searching mechanism. FIG. 2 is a flow chart in accordance with the present invention. In this system a network of document relationships are provided, via step 202. The document relationships are then utilized to define a region of documents that can be utilized to satisfy a user's request. Typically, the region is identified utilizing relationship metadata.

The system and method in accordance with the present invention has two principal advantages. The first advantage of a system and method in accordance with the present invention is that a user can choose a small number of candidates from a large list returned from a query and use the chosen candidate(s) as an example of the type of information that is sought by the query. Based on this user feedback, an improved list of candidates can be generated which account for the text query submitted and the "regions" of documents identified by the user. This list can be generated by utilizing relationship metadata, for example, in a manner described in the patent application Ser. No. 09/620,756, now U.S. Pat. No. 6,611,845, entitled "Method and System for Storing and Managing Sets of Objects", which is incorporated by reference herein.

The second advantage of a system and method in accordance with the present invention is the ability to search within a "region". Examples of regions are: (1) a category; (2) documents that neighbor a given document. A user can then specify a region and then ask a query to be performed in this region. This also reduces the number of candidates returned from the query.

To more particularly describe the system and method in accordance with the present invention, refer now to the following description in conjunction with the accompanying drawings.

First Advantage

The first scenario demonstrates how the "first advantage" is achieved. In this embodiment, before a query can be processed, documents undergo preprocessing for indexing, relevance ranking, and relationship mining. The index, relevance, and relationship metadata is stored for use during a query. This scenario applies the search query followed by the application of relationship metadata to create an improved candidate list.

Figure 3:
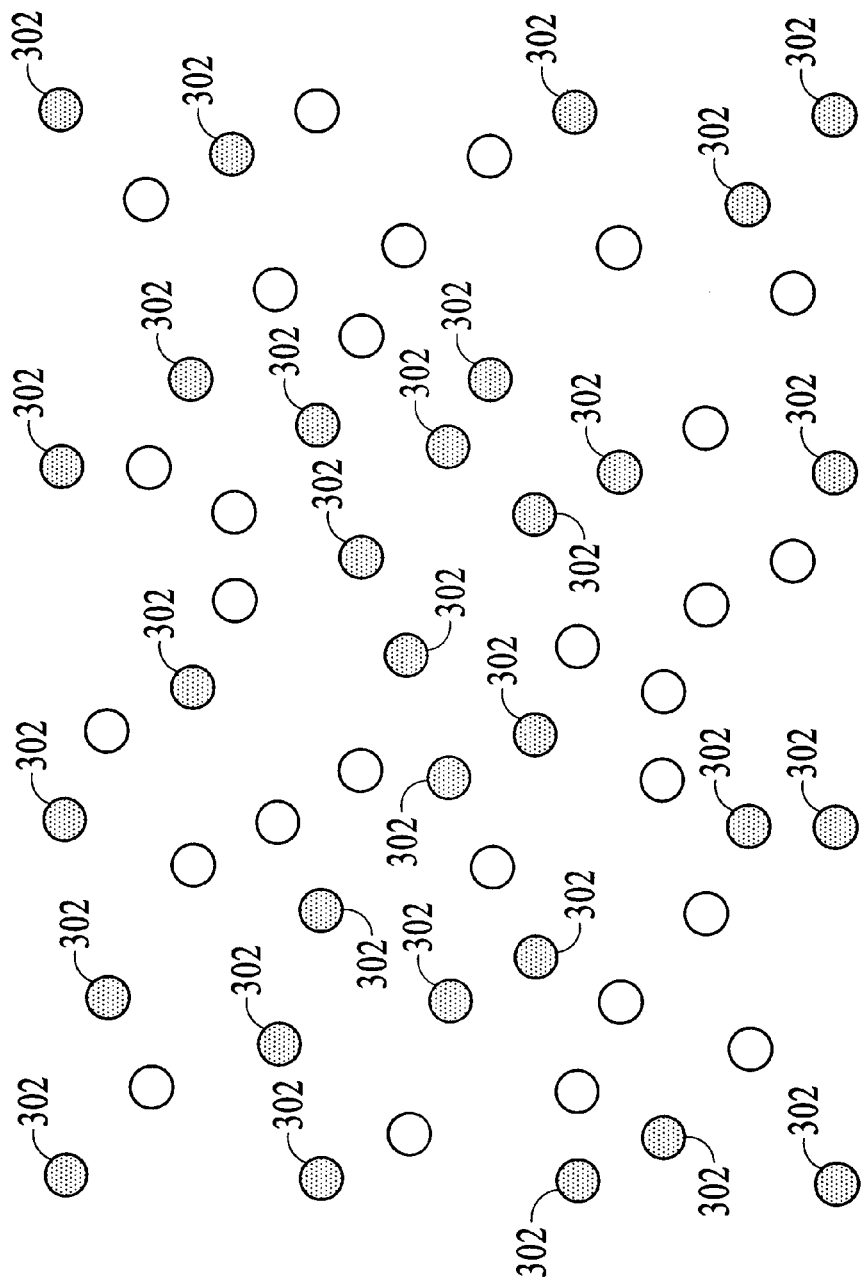
FIG. 3 illustrates the result of a search query.

FIG. 3 illustrates the result of an initial text search query. Each circle represents a document that can be returned by a text search query. After a query has been submitted against all of the documents, the search engine identifies the Original Candidate documents and orders them by relevance. In FIG. 3, the circles that have been identified as 302 have been chosen as candidates by the search engine and returned to the user.

Figure 4:
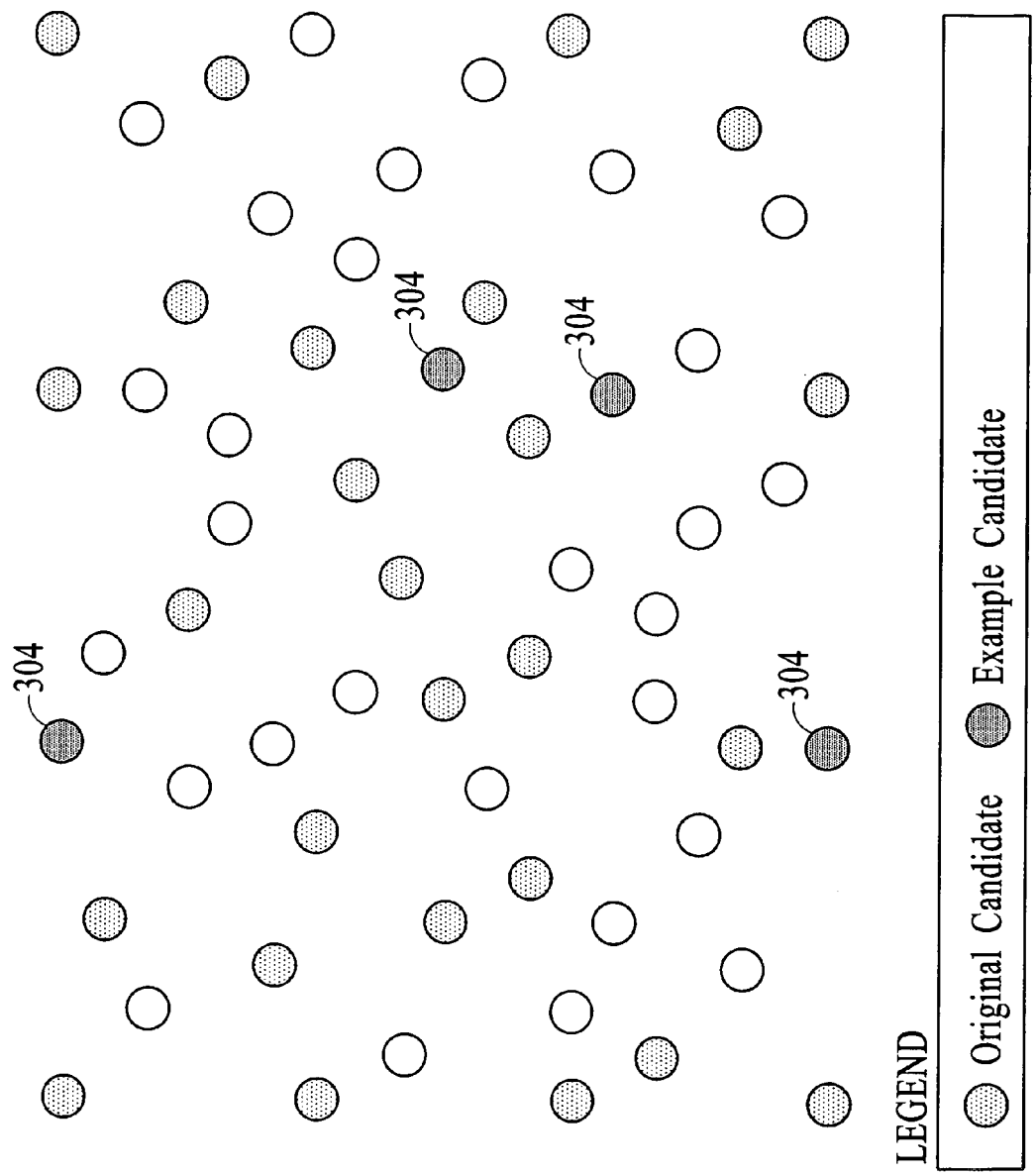
FIG. 4 illustrates the user identifying example candidates.

FIG. 4 illustrates the user identifying example candidates. The user reviews some of the Original Candidate documents to determine examples of the type of document being sought. The user identifies at least one and preferably a smaller number than the original candidates Example Candidate documents to the system. The example candidate documents are labeled 304 in FIG. 4.

Figure 5:
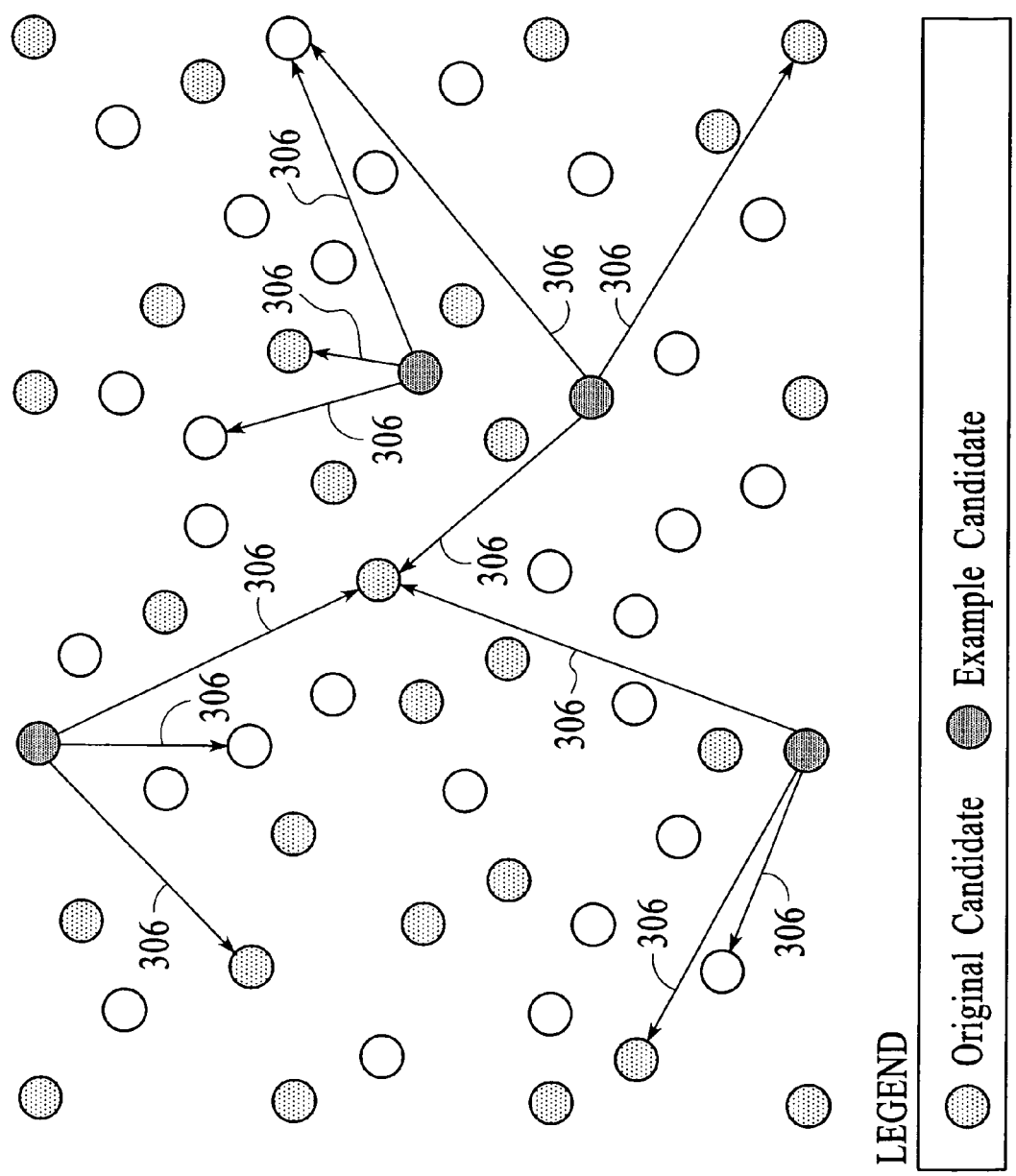
FIG. 5 illustrates locating document related to the example candidates.

FIG. 5 illustrates locating documents related to the Example Candidates document by relationship metadata. The system locates documents that are related to the Example Candidate documents. Some of these documents may be Original Candidate documents; others may not. The relationships are shown as arrows 306 in FIG. 5. As before mentioned, this element can be implemented utilizing the relationship metadata which is described, for example, in application Ser. No. 09/620,756, now U.S. Pat. No. 6,611,845, "Method and System for Storing and Managing Sets of Objects," which is incorporated in its entirety herein.

Figure 6:
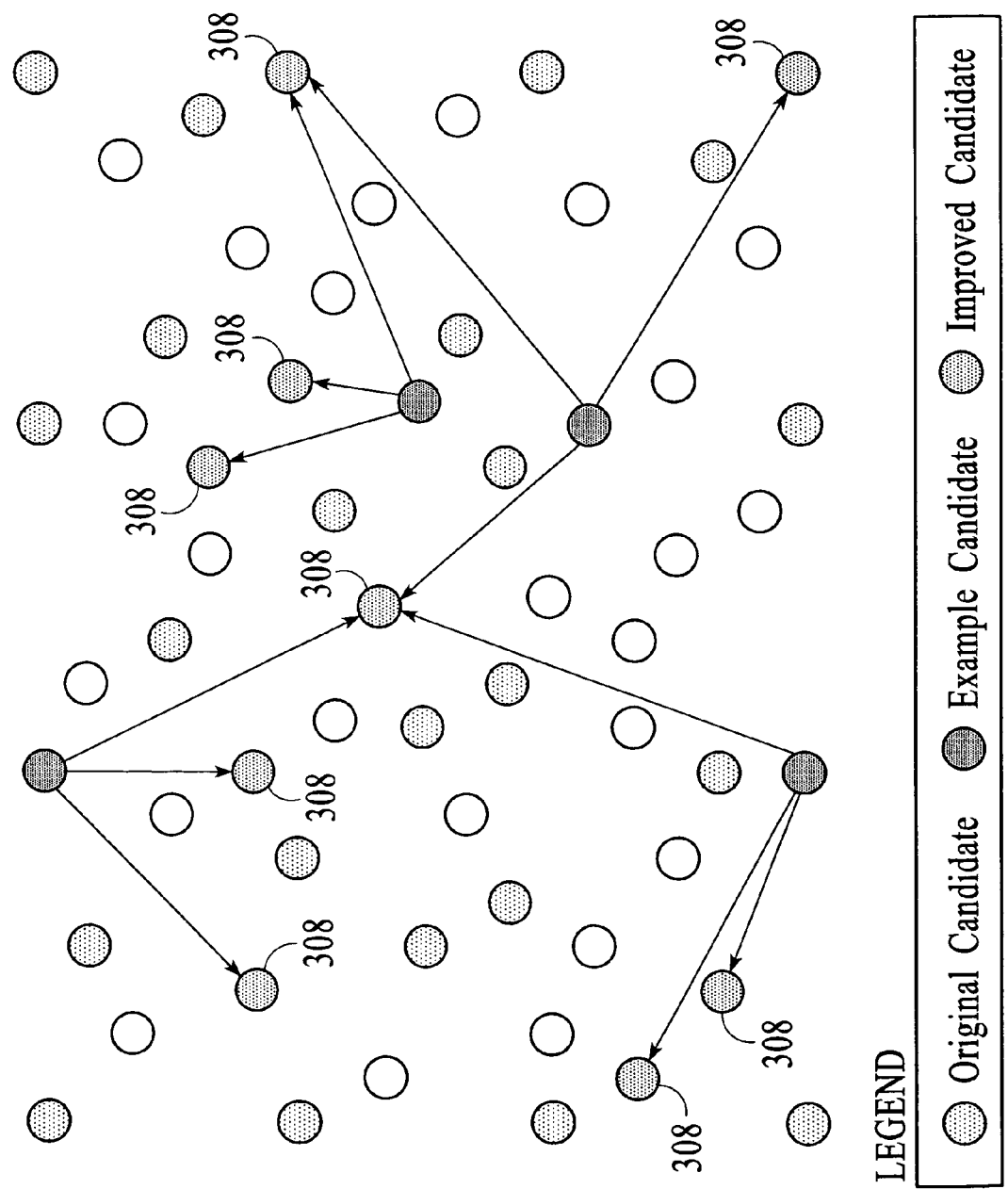
FIG. 6 illustrates providing improved candidate documents.

FIG. 6 illustrates providing a plurality of improved candidate documents. The system now knows which documents are Original Candidate documents, Example Candidate documents, and candidates by relationship. It calculates the new order of presentation by considering the document's relevance ranking, the number of relationships it participates in, and whether it was an Original Candidate document. The new list contains a smaller number of Improved Candidate documents illustrated by circles 308.

Second Advantage

The second scenario demonstrates how the "second advantage" is achieved. This scenario applies the definition of a "region" using relationship metadata, followed by the search query.

Figure 7:
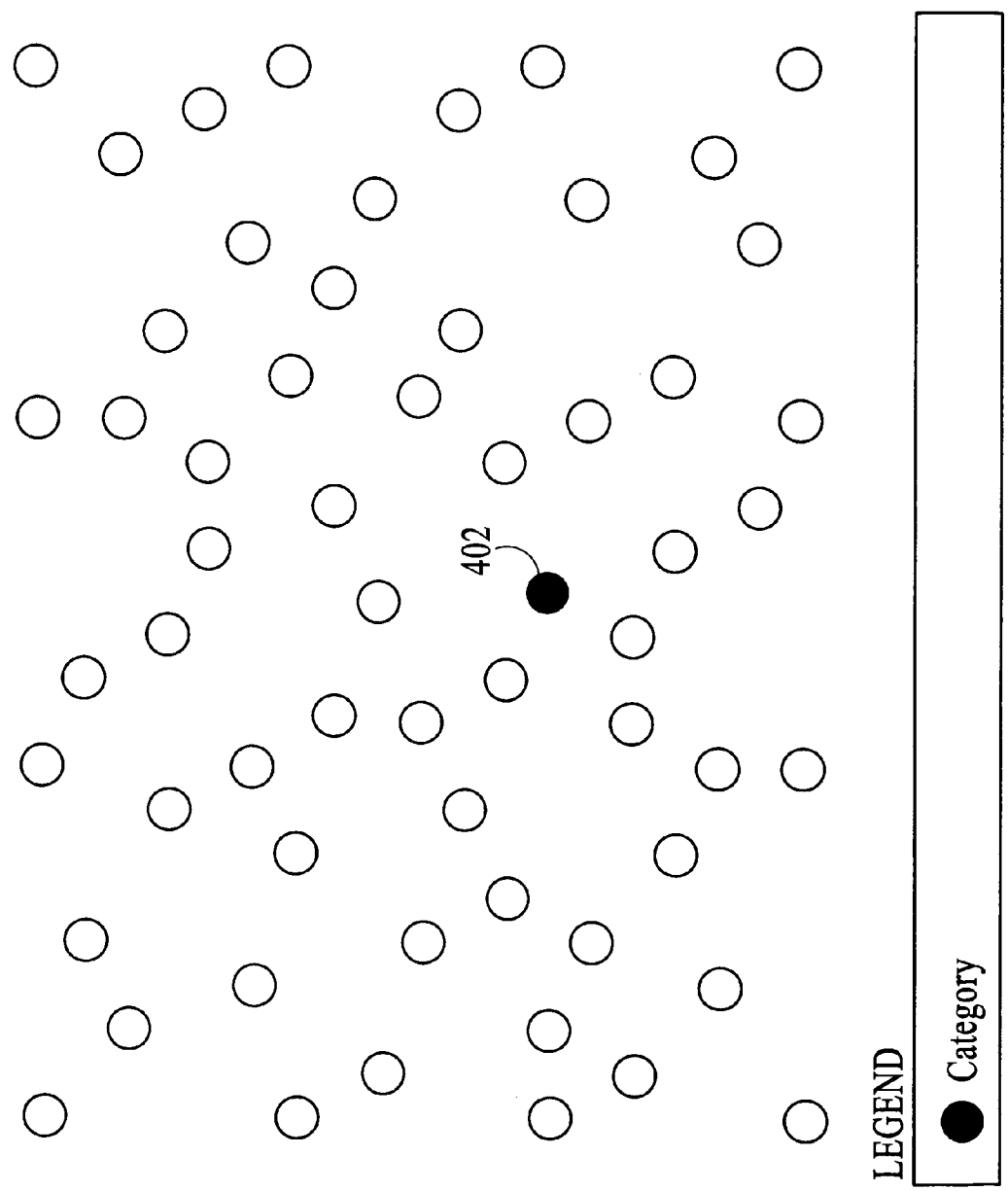
FIG. 7 illustrates selecting a location.

FIG. 7 illustrates selecting a location. A location is selected within the information space. This location can be a category designation, an actual document, or another placeholder in the information space. In this scenario, the circle 402 represents a chosen Category.

Figure 8:
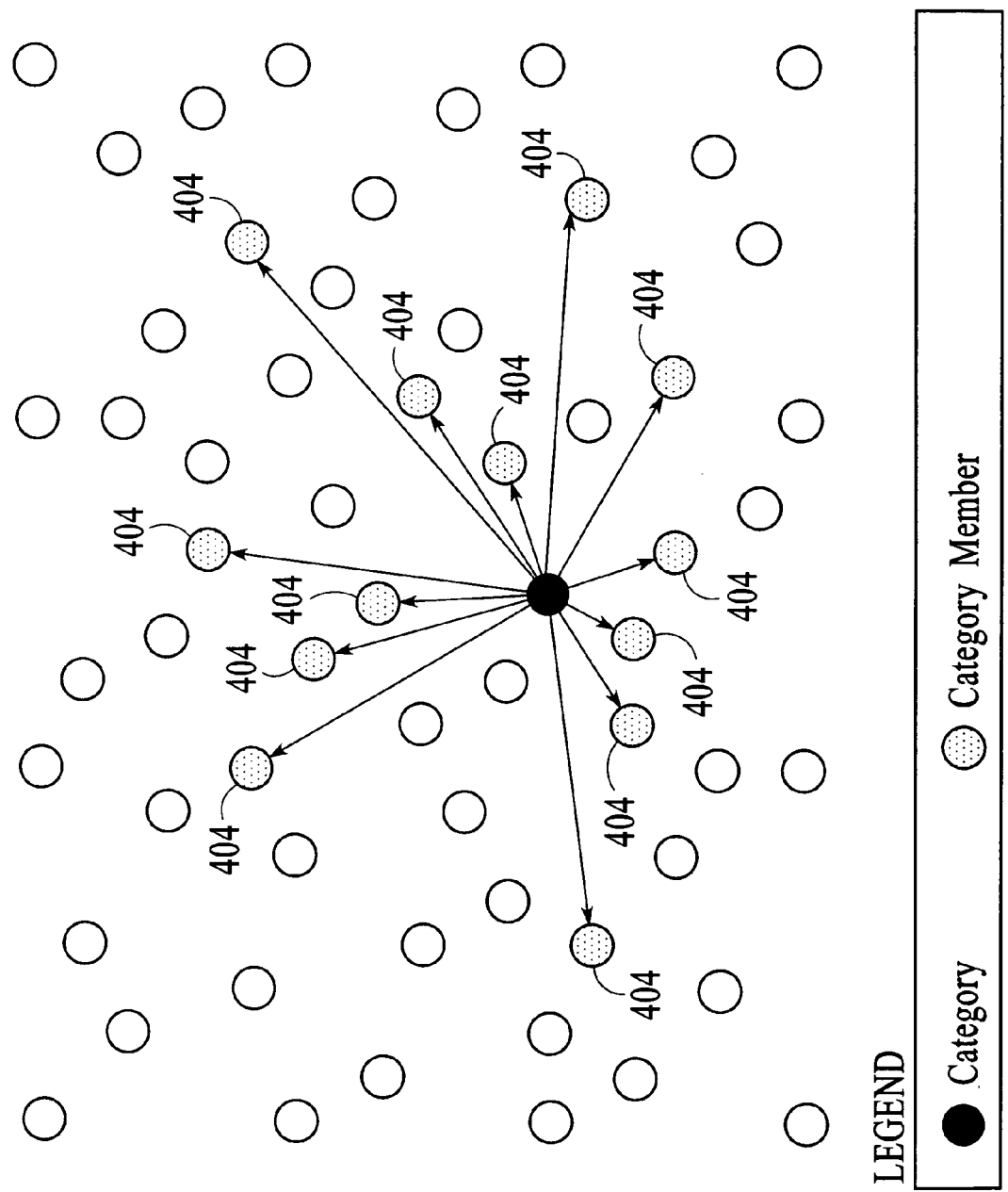
FIG. 8 illustrates finding a plurality of entities relating to the location.

FIG. 8 illustrates finding a plurality of entities relating to the location utilizing relationship metadata. This is also performed utilizing the above-identified copending application. For example, from a given Category, all of the Category Members are found by the system. If the scenario had chosen a document rather than a category, related documents would have been found by the system. In general, this step creates a "region" from the relationship metadata. The circles 404 represent the members of the category that form the region to be searched.

Figure 9:
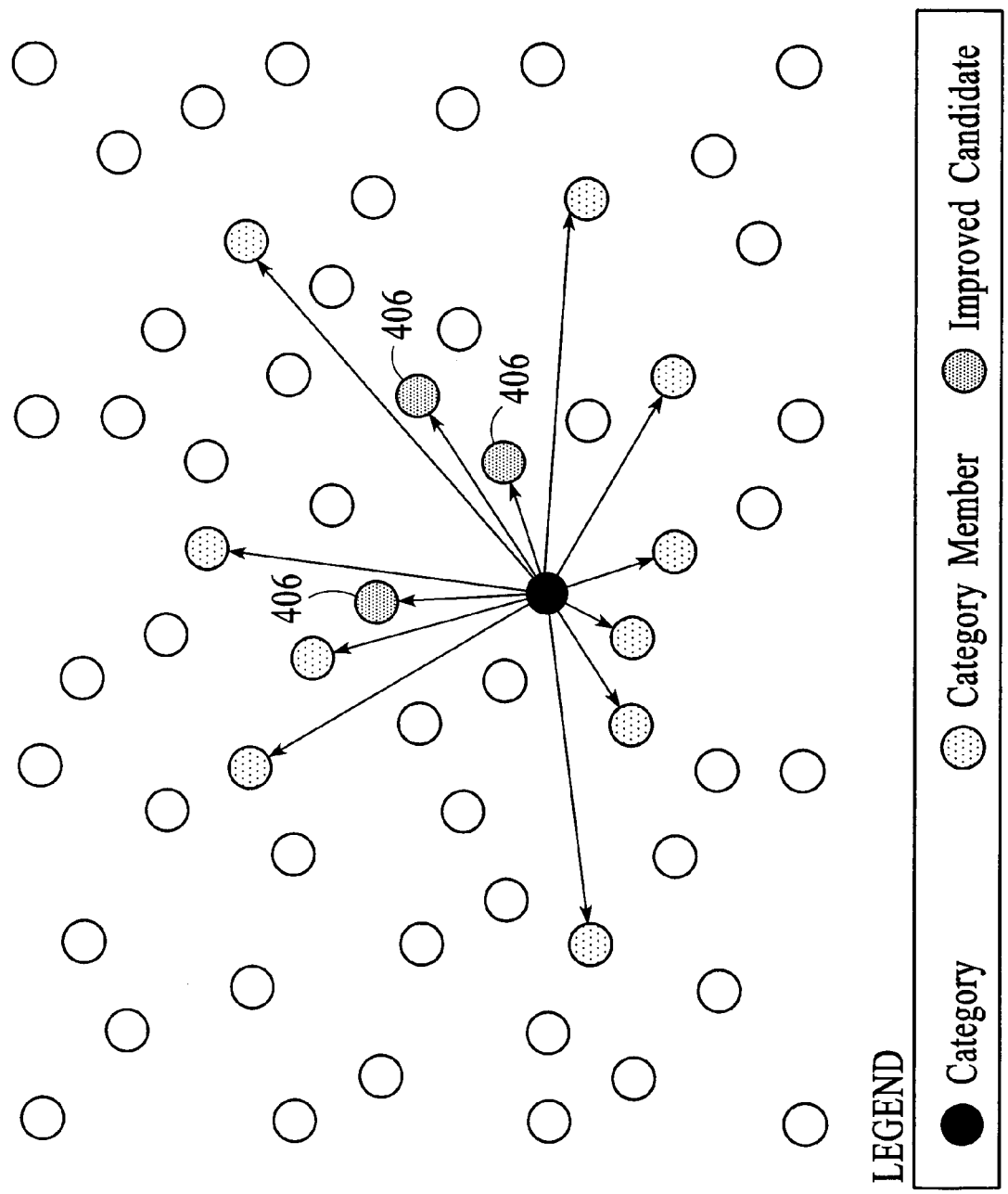
FIG. 9 illustrates applying a search query to the members of the category.

FIG. 9 illustrates applying a search query to the members of the category. The search query is then applied to all members of the region to locate all of the Candidate documents that satisfy the query. The Improved Candidate list is returned to the user. The circles 406 represent the documents that satisfy the search query and are members of the region.

In a method and system in accordance with the present invention, a network of document relationships are utilized to identify the "region" of documents that can be used to satisfy a user's request. There are two advantages of utilizing text searching and relationship metadata. The first is gained by performing the search, then utilizing the relationship metadata. The second is gained by utilizing the relationship metadata, then performing the search. In so doing, a significantly smaller list is obtained via the system than when utilizing conventional text searching algorithms.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for improving a text search comprising the steps of:
   (a) preprocessing a plurality of documents, including performing relationship mining that provides a network of document relationships for the documents and relationship metadata, wherein a relevance ranking is determined during the preprocessing;
   (b) receiving an identification from a user of at least one candidate document from a first plurality of documents obtained via a text search query provided by the user, the text search query using the preprocessed documents, wherein the step (a) of preprocessing is performed before the first plurality of documents are obtained via the text search query;
   (c) locating a second plurality of documents that are related to the at least one candidate document by the relationship metadata, wherein the network of document relationships is used to locate the second plurality of documents; and
   (d) providing a third plurality of documents to the user as search results to the text search query, each of the third plurality of documents being provided based upon the at least one candidate document and the number of relationships it has with the first and second plurality of documents, wherein the network of document relationships and the relevance ranking are used to provide the third plurality of documents.

2. The method of claim 1 wherein the number of the second plurality of documents is less than the first plurality of documents.

3. The method of claim 1 wherein each of the third plurality of documents are provided based upon a relevance, a number of relationships it has with first and second plurality of documents and whether it was the at least one candidate document.

4. The method of claim 1 wherein the third plurality of documents is listed in an order of presentation to the user that is based on the number of relationships each of the third plurality of documents has with the first and second plurality of documents, and based on whether each of the third plurality of documents was the at least one candidate document.

5. A system for improving a text search comprising:
   means for preprocessing a plurality of documents, including means for performing relationship mining that provides a network of document relationships for the documents and relationship metadata, wherein a relevance ranking is determined during the preprocessing;

means for receiving an identification from a user of at least one candidate document from a first plurality of documents obtained via a text search query provided by the user, the text search query using the preprocessed documents, wherein the means for preprocessing performs the preprocessing before the first plurality of documents are obtained via the text search query;

means for locating a second plurality of documents that are related to the at least one candidate document by the relationship metadata, wherein the network of document relationships is used by the means for locating the second plurality of documents; and means for providing a third plurality of documents to the user as search results to the text search query, each of the third plurality of documents being provided based upon the at least one candidate document and the number of relationships it has with the first and second plurality of documents, wherein the network of document relationships and the relevance ranking are used by the means for providing the third plurality of documents.

6. The system of claim 5 wherein the number of the second plurality of documents is less than the first plurality of documents.

7. The system of claim 5 wherein each of third plurality of documents are provided based upon a relevance, a number of relationships it has with first and second plurality of documents and whether it was the at least one candidate document.

8. The system of claim 5 wherein the third plurality of documents is listed in an order of presentation to the user that is based on the number of relationships each of the third plurality of documents has with the first and second plurality of documents, and based on whether each of the third plurality of documents was the at least one candidate document.

9. A computer readable medium containing program instructions for improving a text search comprising:
  (a) preprocessing a plurality of documents, including performing relationship mining that provides a network of document relationships for the documents and relationship metadata, wherein a relevance ranking is determined during the preprocessing;
  (b) receiving an identification from a user of at least one candidate document from a first plurality of documents obtained via a text search query provided by the user, the text search query using the preprocessed documents, wherein the step (a) of preprocessing is performed before the first plurality of documents are obtained via the text search query;
  (c) locating a second plurality of documents that are related to the at least one candidate document by the relationship metadata, wherein the network of document relationships is used to locate the second plurality of documents; and
  (d) providing a third plurality of documents to the user as search results to the text search query, each of the third plurality of documents being provided based upon the at least one candidate document and the number of relationships it has with the first and second plurality of documents, wherein the network of document relationships and the relevance ranking are used to provide the third plurality of documents.

10. The computer readable medium of claim 9 wherein the number of the second plurality of documents is less than the first plurality of documents.

11. The computer readable medium of claim 9 wherein each of third plurality of documents are provided based upon a relevance, a number of relationships it has with first and second plurality of documents and whether it was the at least one candidate document.

12. The computer readable medium of claim 9 wherein the third plurality of documents is listed in an order of presentation to the user that is based on the number of relationships each of the third plurality of documents has with the first and second plurality of documents, and based on whether each of the third plurality of documents was the at least one candidate document.

* * * * *